(12) United States Patent
Nash et al.

(10) Patent No.: US 7,966,738 B2
(45) Date of Patent: Jun. 28, 2011

(54) LASER GUIDE

(75) Inventors: Derek J. Nash, Huntersville, NC (US);
Matthew Scott Anderson, Charlotte, NC (US); Paul Hemingfield, Statesville, NC (US); Craig Peter Ernest Davidson, Cornelius, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 1238 days.

(21) Appl. No.: 11/567,351

(22) Filed: Dec. 6, 2006

(65) Prior Publication Data
US 2008/0137339 A1    Jun. 12, 2008

(51) Int. Cl.
B26D 7/00    (2006.01)
(52) U.S. Cl. ............... 33/286; 362/259; 83/520; 83/478
(58) Field of Classification Search ............ 33/286; 362/259
See application file for complete search history.

(56) References Cited

U.S. PATENT DOCUMENTS

| | | | |
|---|---|---|---|
| 5,862,727 A | 1/1999 | Kelly | |
| 6,007,218 A * | 12/1999 | German et al. | 362/259 |
| 6,035,757 A | 3/2000 | Caluori et al. | |
| 6,178,649 B1 * | 1/2001 | Wu | 33/286 |
| 6,431,732 B1 * | 8/2002 | Brown et al. | 362/259 |
| 6,755,107 B2 | 6/2004 | Peot et al. | |
| 6,976,764 B2 * | 12/2005 | Cheng et al. | 362/89 |
| 7,029,149 B2 | 4/2006 | Tung | |
| 2005/0066533 A1 * | 3/2005 | Wheeler et al. | 33/286 |
| 2006/0037202 A1 * | 2/2006 | Long et al. | 33/286 |
| 2006/0185181 A1 * | 8/2006 | Long et al. | 33/286 |
| 2008/0034931 A1 | 2/2008 | Nash | |

FOREIGN PATENT DOCUMENTS

NZ    517285    12/2002

OTHER PUBLICATIONS

Unpublished, co-pending U.S. Appl. No. 10/995,766 filed Nov. 22, 2004 entitled, "Laser Device for Power Tools".
Unpublished, co-pending U.S. Appl. No. 11/463,606 filed Aug. 10, 2006 entitled, "Laser Guide".
Inellectual Property Office of New Zealand, Examination Report, Dec. 11, 2008.

* cited by examiner

*Primary Examiner* — Anabel M Ton
(74) *Attorney, Agent, or Firm* — Dennis J. Williamson; Deborah H. Spencer; Moore & Van Allen PLLC (57) ABSTRACT

A laser guide for rotating tools comprises a first housing portion and a second housing portion. A seal is provided between the first housing portion and the second housing portion. A lens is located in the first housing portion or second housing portion. A seal is provided between the lens and the first housing portion. A method of testing a laser guide comprising applying a pressure to an internal chamber of the laser guide. Monitoring the laser guide for pressure gains or losses in the chamber.

15 Claims, 14 Drawing Sheets

FIG. 13

LASER GUIDE

The invention relates generally to laser guides for power saws and more particularly to a laser guide that is suitable for use in wet environments and other hostile environments.

BACKGROUND OF THE INVENTION

Power saws such as chop saws, miter saws and radial saws are known that consist of a saw blade or cutting wheel that is mounted on an arbor and rotated at high speeds. In one arrangement the arbor is mounted on a movable support such the saw blade or cutting wheel can be brought into engagement with a work piece. In another arrangement the cutting wheel or blade is stationary and the workpiece is moved into engagement with the blade or wheel. One problem with such saws is the difficulty in aligning the saw blade or cutting wheel with the work piece such that the cutting wheel or blade cuts the work piece in the desired location.

To overcome this problem, laser guides have been developed that produce a line of light on the work piece that is used to align the work piece with the blade or cutting wheel. One typical laser guide comprises a housing that is mounted on the saw adjacent the saw blade or cutting wheel. The laser guide rotates and produces a visual line of light on the work piece.

A typical wet saw or tile saw consists of a motor housing that supports a motor for rotating an arbor or spindle shaft (hereinafter "arbor"). The arbor supports a cutting wheel or blade for rotation therewith. In one application the blade or wheel may relatively dull and may use sand or diamond particles to grind a channel in a hard workpiece such as ceramic tile. Because of the heat generated in such an operation, the typical wet saw includes a water pump that delivers a spray or stream of water to the blade and workpiece surface. The excess water and dust falls into a catch basin or tub located below the workpiece. It is to be understood that such saws come in a wide variety of designs and can be used in a variety of different applications. Moreover, in applications other than wet saws, the work environment may be hostile to the laser guide where dust, debris, fluids and other materials are present.

A laser guide suitable for use in wet environments such as with wet tile saws and other hostile environments is desired.

SUMMARY OF THE INVENTION

A laser guide for rotating tools comprises a first housing portion and a second housing portion. A seal is provided between the first housing portion and the second housing portion to seal the internal chamber of the laser guide from the external environment. A lens is located in the first housing portion or second housing portion. A seal is provided between the lens and the first housing portion.

A method of testing a laser guide comprises providing a housing defining an internal chamber. A source of high and/or low pressure is applied to the internal chamber. The pressure within the chamber is monitored for changes that indicate whether or not a good seal is provided.

DETAILED DESCRIPTION OF EMBODIMENTS OF THE INVENTION

Figure 1A:
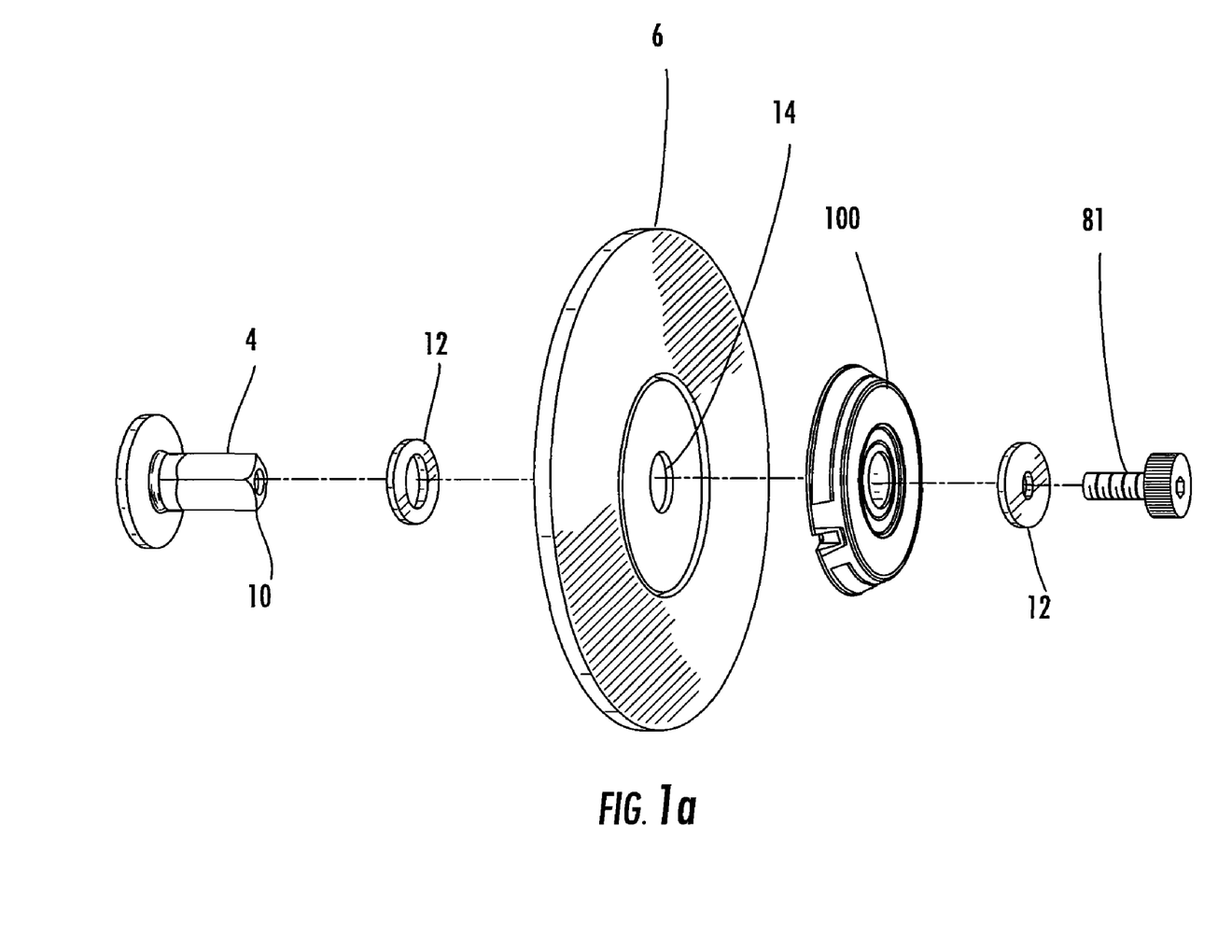
FIGS. 1a and 1b are perspective views of typical mounting arrangements for the laser guide of the invention.

Referring to FIG. 1a, a typical mounting system for the laser guide 100 is shown. The laser guide 100 is mounted on the arbor 4 of a rotating cutting device such as chop saws, miter saws and radial saws or wet saws. The arbor 4 extends into a central arbor hole 14 of the wheel or blade 6. The laser guide 100 is disposed on the arbor 4 abutting the side of the wheel or blade 6. Finally, a fastening member 8 is tightened on the arbor 4 to compress these elements together to retain the wheel or blade 6 and laser guide 100 on the arbor 4. In the illustrated device a bolt is illustrated as the fastening member 8 that engages an internally threaded portion 10 of the arbor 4. Other fasteners may also be used. A washer 12 may be used on the arbor 4 between the fastener 8 and laser guide 100 or between the blade or wheel 6 and the arbor 4.

Figure 1B:
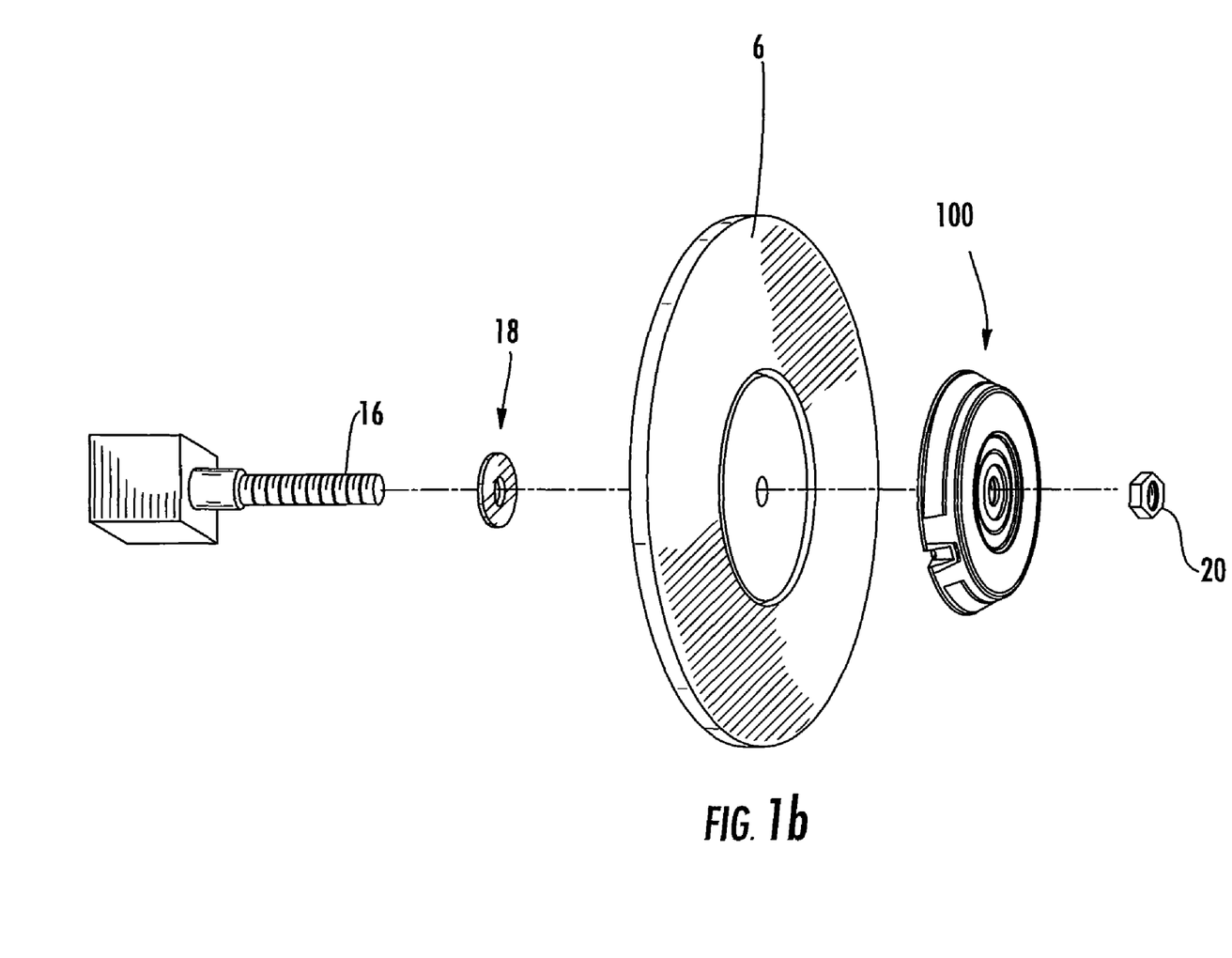

An alternate mounting system is shown in FIG. 1b where a threaded arbor 16 is connected to the motor of the saw. An inner washer 18 is placed over the arbor 16, the blade or wheel 6 is placed over the arbor adjacent the inner washer 18 and the laser guide 100 is placed on the arbor adjacent blade or wheel 6. A fastening member 20 such as nut threadably engages the threaded arbor 16 to secure the blade and laser guide on the arbor.

The force generated as the fastening member 8, 20 is tightened is transferred to the cutting wheel or blade 6 and laser guide 100 to retain the blade or wheel 6 and laser guide 100 on the arbor 4, 16 such that the blade or wheel 6 and laser guide rotate with the arbor. The arbor 4, 16 is typically connected to a drive motor of the cutting device such that the motor rotates the cutting wheel or blade 6. The motor may be connected directly to the motor or a transmission such as by drive gears or a belt drive may be used to connect the motor to the arbor.

When activated the laser guide 100 generates a beam of light that is directed along the adjacent face of the blade and onto the workpiece. The laser guide 100 rotates with the blade or cutting wheel such that the beam of light appears as a visible line of light on the workpiece and can be used to locate the workpiece relative to the blade or wheel 6. The laser guide 100 may be used in wet environments such as a wet saw or tile saw where water is sprayed on the blade or wheel and laser guide 100. While the laser guide 100 has specific application in wet environments it also has applicability in any hostile environment where it is desirable to isolate the interior of the laser guide from the external environment. It is to be understood that in addition to use in wet environments where water contacts the laser guide, the laser guide may also be used to prevent the intrusion of dust, other liquids or gas into the interior of the laser guide. Provision of a liquid tight, gas tight and/or dust tight sealed joint or seam between components is referred to herein as a "seal" or "sealed".

Figure 2:
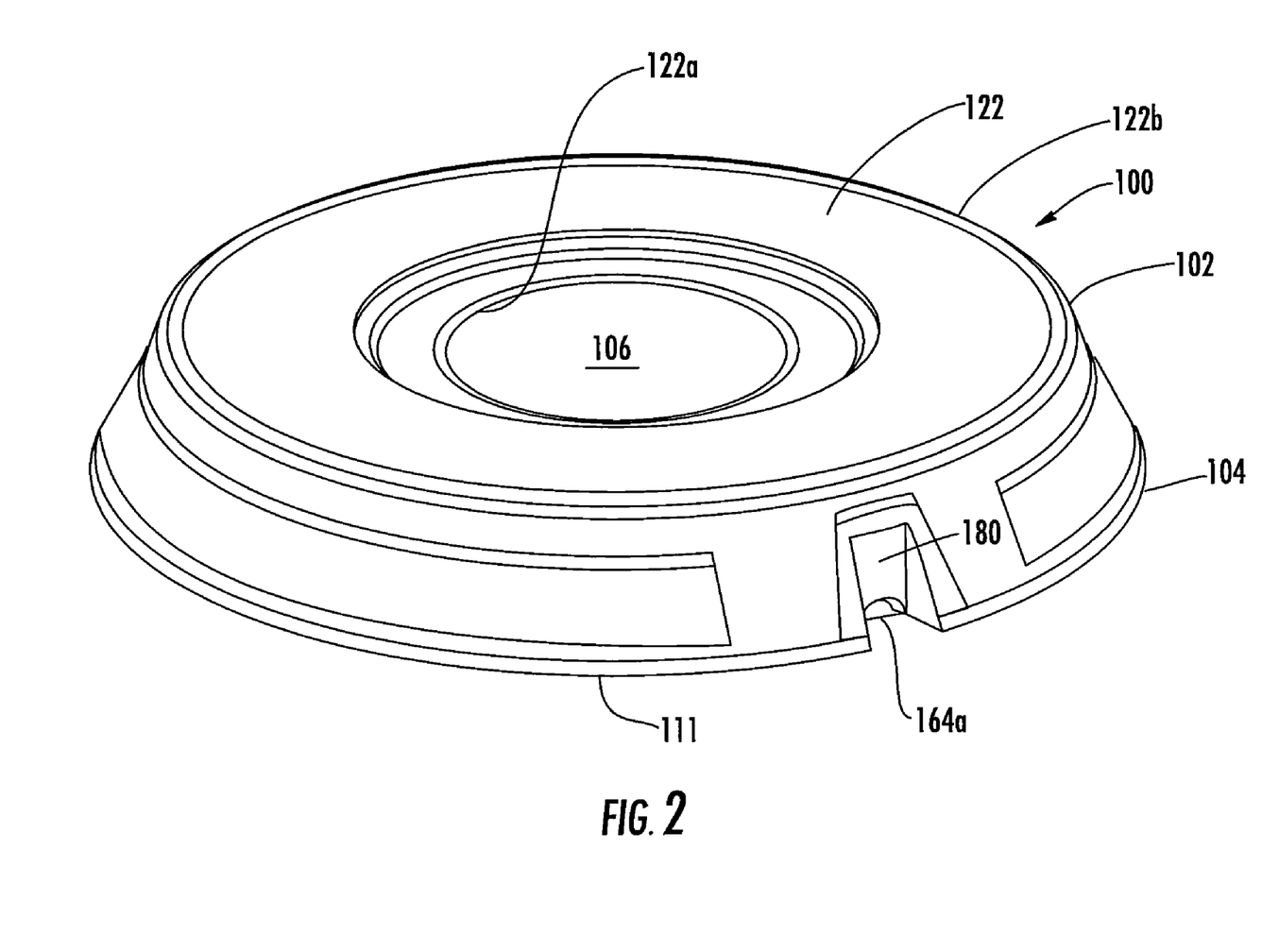
FIG. 2 is a perspective view of an embodiment of the laser guide of the invention.
Figure 3:
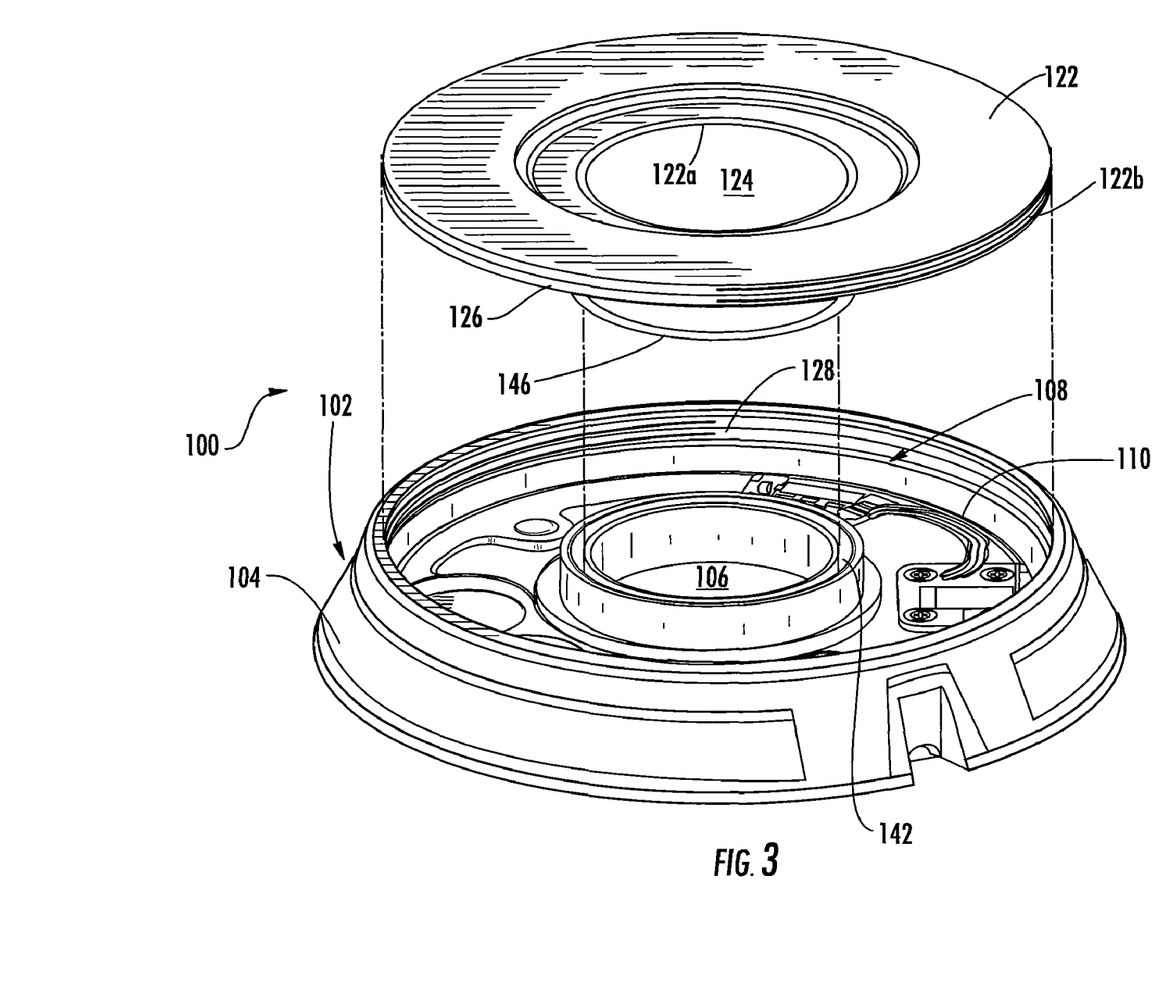
FIG. 3 is an exploded perspective view of an embodiment of the laser guide of the invention.
Figure 4:
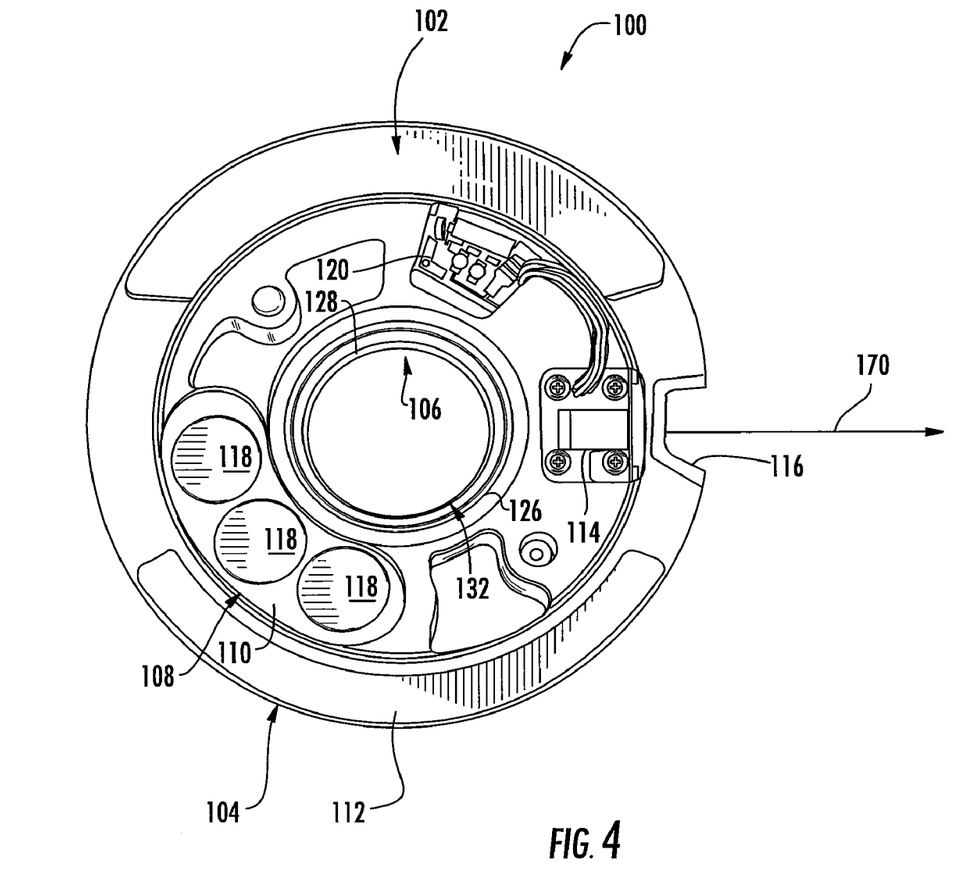
FIG. 4 is a plan view of an embodiment of the laser guide of the invention with the cover removed.

Embodiments of the laser guide 100 are illustrated in FIGS. 2 through 12. The laser guide 100 comprises a first housing portion or housing 102 having a generally circular outer periphery 104 although the shape of the housing may take any form. A centrally located interior aperture 106 is formed in the housing 102 such that housing 102 may have a generally annular shape. Housing 102 has an interior portion 108 that defines a chamber 110 for retaining the laser guide components as best shown in FIGS. 3 and 4.

Figure 12:
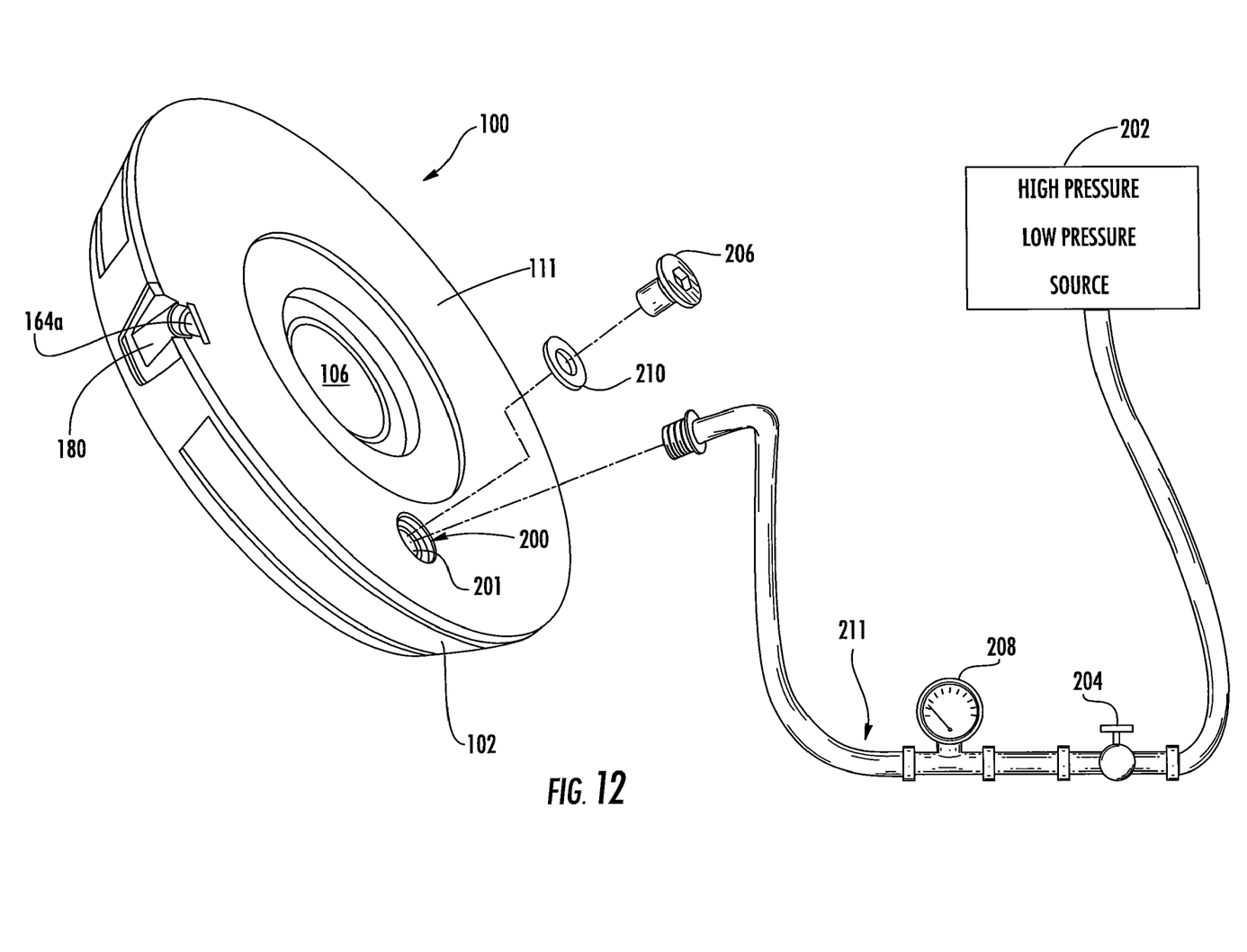
FIG. 12 is a perspective back view illustrating of an embodiment of the test procedure for a laser guide.

Referring to FIG. 4, located within chamber 110 is a light source capable of generating a beam of light. One such light source is a laser 114. The light beam generated by laser 114 is directed into a prism or lens which reflects and translates the beam of light 170 adjacent to the mounting surface 111 (the surface adjacent the wheel or blade 6 as best shown in FIG. 12) and out of the housing 102 at opening 116. Batteries 118 or other power source may be provided for powering the laser 114. An on/off switch 120 such as a centrifugal switch, manual switch or the like is provided for turning the laser on and off.

Referring to FIGS. 2 and 3, a second housing portion or cover 122 is secured to the housing portion 102 to isolate the laser components in chamber 110 from the external environment. Cover 122 includes a centrally located interior aperture 124 that is coextensive with aperture 106. In order to isolate the internal electronics of the laser guide from the external environment in a sealed manner, seals must be created between a first seam between the inner diameter 122a of the cover 122 and the housing 102 and a second seam between the outer diameter 122b of the cover 122 and the housing 102. The peripheral edge surface of housing cover 122 at outer diameter 122b is provided with screw threads 126 that mate with screw threads 128 formed on the mating surface of housing 102. The screw threads 126 are tightly engaged with the threads 128 such that water, dust and gas cannot penetrate the seal between these components. In one embodiment a thread sealer is applied to the threads to further insure a liquid tight seal. The thread sealer may comprise Teflon tape, epoxy, silicone sealers or the like. Other thread sealers may also be used.

Figure 5:
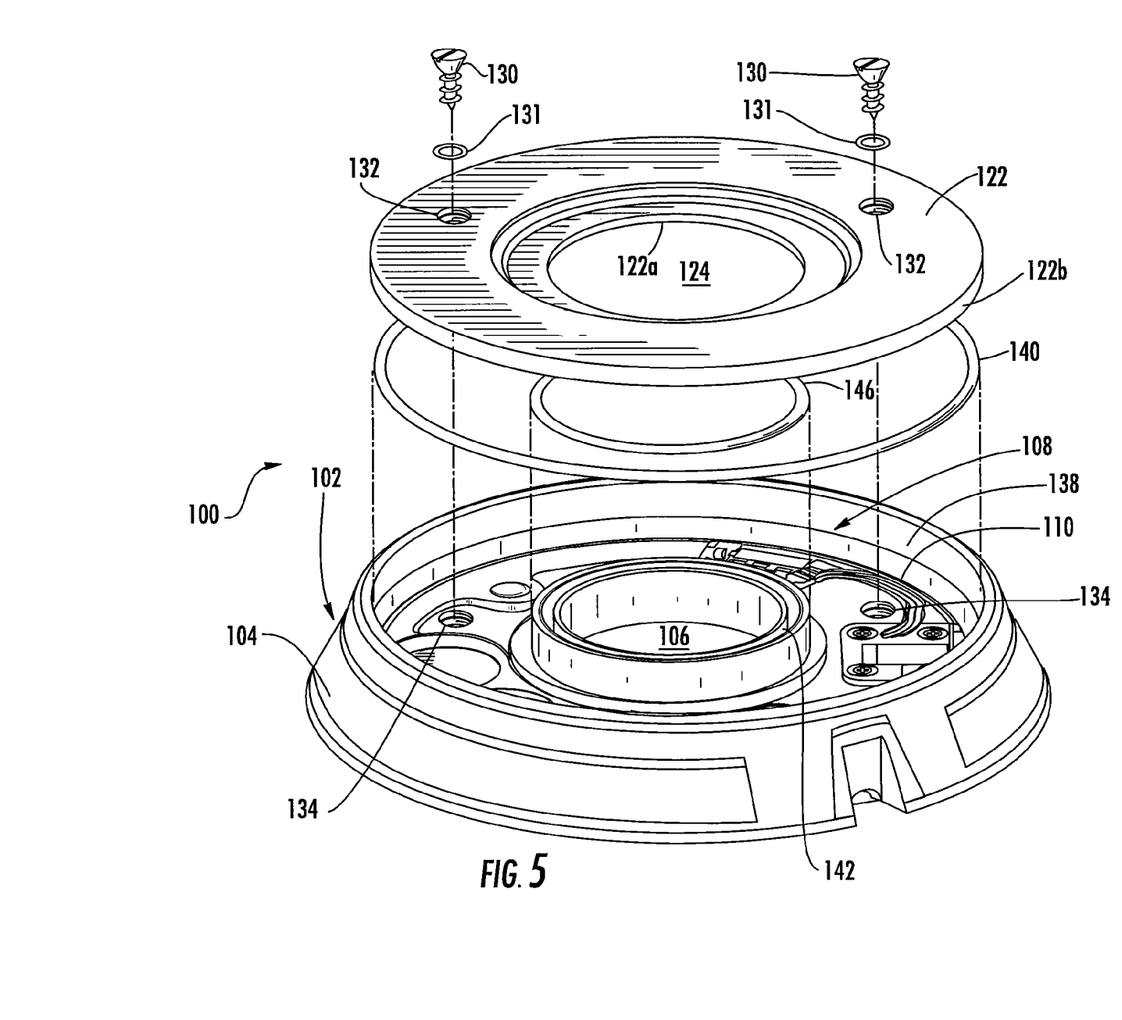
FIG. 5 is an exploded perspective view of an embodiment of the laser guide of the invention.

Referring to FIG. 5 where like reference numerals are used to identify like components previously described with respect to FIGS. 2, 3 and 4 an alternate embodiment is illustrated where the mating screw threads 126 and 128 are eliminated and the cover 122 is connected to the housing 102 using screws 130 that engage with apertures 132 formed in the cover and that threadably engage mating threaded bores 134 formed in the housing. Other suitable fasteners such as rivets, compression fittings or the like may also be used. O-rings or gaskets 131 are provided between the fasteners 130 and cover 122 to provide a seal between these components.

In order to create a liquid tight seal between the outer periphery of cover 122 and the housing 102, sealing surface 138 is formed on the housing 102. An o-ring seal 140 is located between the cover 122 and the sealing surface 138 and is dimensioned such that when the cover 122 is tightly secured to the housing 102 using fasteners 130, the o-ring seal 140 is compressed between the sealing surface 138 and cover 122 to create a tight seal. A similar o-ring seal or gasket could also be used in the embodiment of FIG. 3 in addition to screwthreads 126 and 128.

Referring to FIGS. 3 and 5, to seal the inner diameter 122a of the cover 122 with the housing 102 o-ring groove 142 is formed on the housing 102. An o-ring seal 146 is located in groove 142 and is dimensioned such that when the cover 122 is tightly secured to the housing 102 using either fasteners 130 (shown in FIG. 5) or mating threads 126 and 128, the o-ring seal 146 is compressed between the groove 142 and the cover 122 to create a tight seal therebetween. The o-ring 146 and o-ring groove 142 may be replaced by a flat sealing surface and gasket. Moreover, an o-ring groove similar to groove 142 may be used to retain o-ring 140 in housing 104.

A tight seal must also be created between the lens 160 and the housing 102. Referring to FIGS. 6 through 10, one embodiment for providing the liquid tight seal is shown comprising a lens 160 having a generally parallel parallelpiped shape. In the illustrated embodiment the lens 160 includes six sides 161, 162, 163, 164, 165, and 166 arranged as opposed generally parallel pairs. Other shapes of the lens may also be used. The lens includes optical surfaces that reflect, refract or transmit light to transmit the light from the light producing source such as a diode to the exterior of the device and non-optical surfaces that are not involved in the transmission of light. In the illustrated embodiment the light beam is represented by line 170 that passes through first side 161, reflects off of second side 162, reflects off of third side 163, and passes through fourth side 164. The second side 162 and the third side 163 comprise optical surfaces because the light beam reflects off of these surfaces. A portion 161a of the first side 161 and a portion 164a of the second side 164 also comprise optical surfaces where the light beam 170 passes through those sides. The portions of sides 161, 164, 165 and 166 that are bounded by shaded area 172 comprise the non-optical surfaces of the illustrated lens because these surfaces are not actively involved with the transmission of light into, through and out of the lens. It will be understood that a lens having a different shape or construction than the illustrated embodiment may also be used in the laser guide of the invention and that the specific portions of the lens that define the optical surfaces and non-optical surfaces may vary. The non-optical surfaces 172 extend completely around the periphery of the lens 160.

Figure 9:
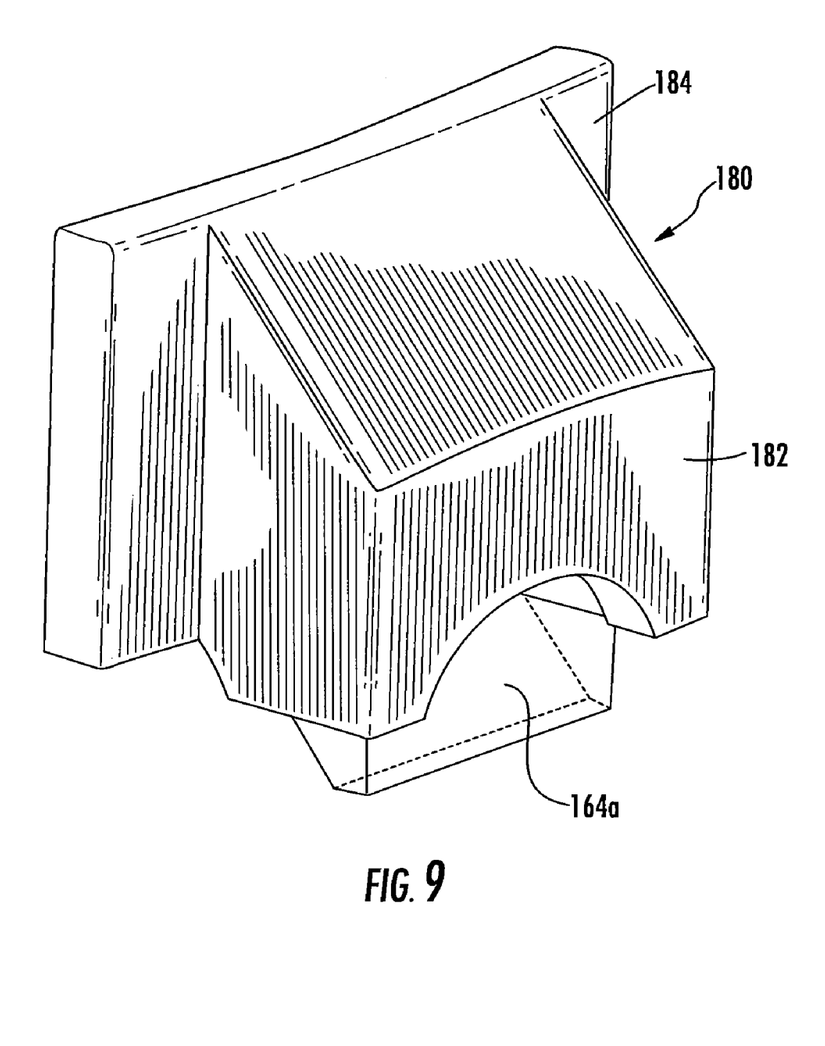
FIG. 9 is a perspective view of an embodiment of a lens and lens holder used in one embodiment of the invention.
Figure 10:
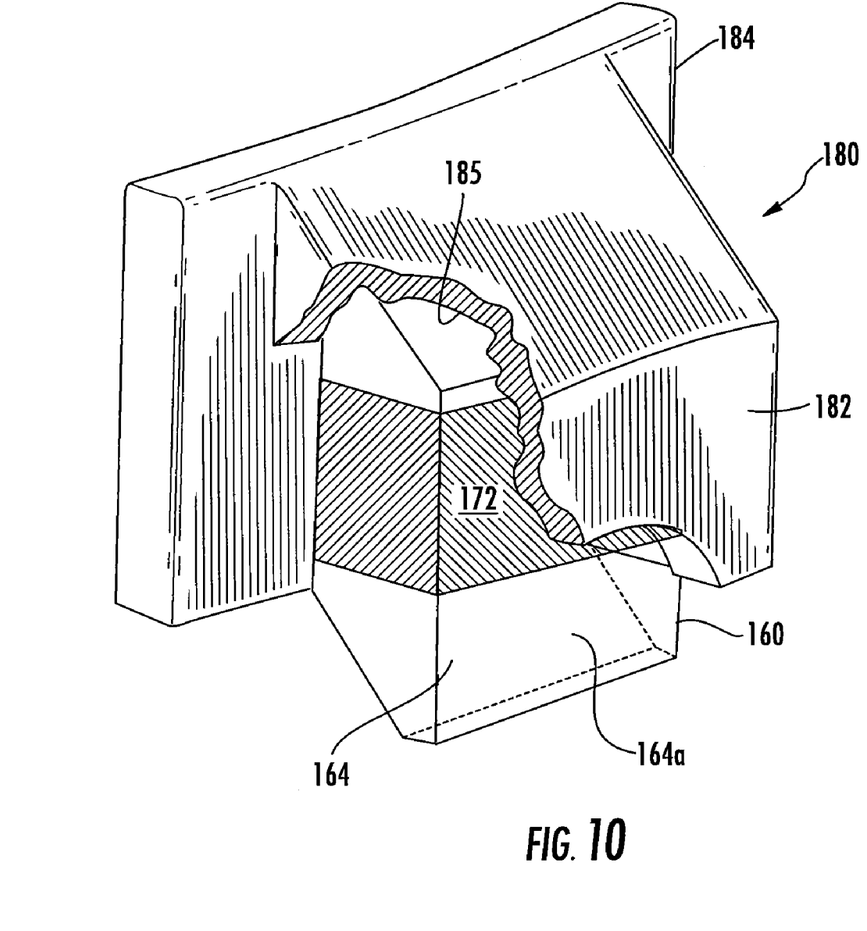
FIG. 10 is a partial cut-away perspective view of an embodiment of a lens and lens holder used in one embodiment of the invention.

Referring to FIGS. 9 and 10, lens holder 180 comprises a first lens retaining portion 182 and a second flange portion 184. The retaining portion 182 has an internal void 184 that is shaped and dimensioned to retain the lens 160 in a fixed position. In the illustrated embodiment the lens is inserted into the void such that portion 161a of side 161 is disposed adjacent aperture 186 such that the light beam can enter the lens 160 through aperture 186. The portion 164a of side 164 is arranged such that it extends from lens holder 180 to direct the light beam out of aperture 116 formed in housing 102. The lens 160 may be retained in the lens holder 180 by application of an adhesive or sealant located around the periphery of the lens in the area defined by dashed area 172. In one embodiment a silicone adhesive sealant is used. Epoxy, urethane or other compounds may also be used. Because the area 172 is the non-optical portion of the lens, the application of sealant or adhesive or the like to the lens in this area will not adversely affect the optical performance of the lens. Also, because area 172 extends completely around the periphery of the lens 160 the sealant and/or adhesive extend around the lens to create a seal between the lens and the lens holder 180. The lens 160 may be retained in the holder by additional structure such as a mechanical engagement of the holder 180 with the lens 160 such that the sealant provided in the non-optical portions 172 of the lens is used to create a liquid tight seal but does not necessarily serve hold the lens in position in the holder. Further a combination of the sealant and separate attachment mechanism may be used to secure the lens to the lens holder.

Figure 6:
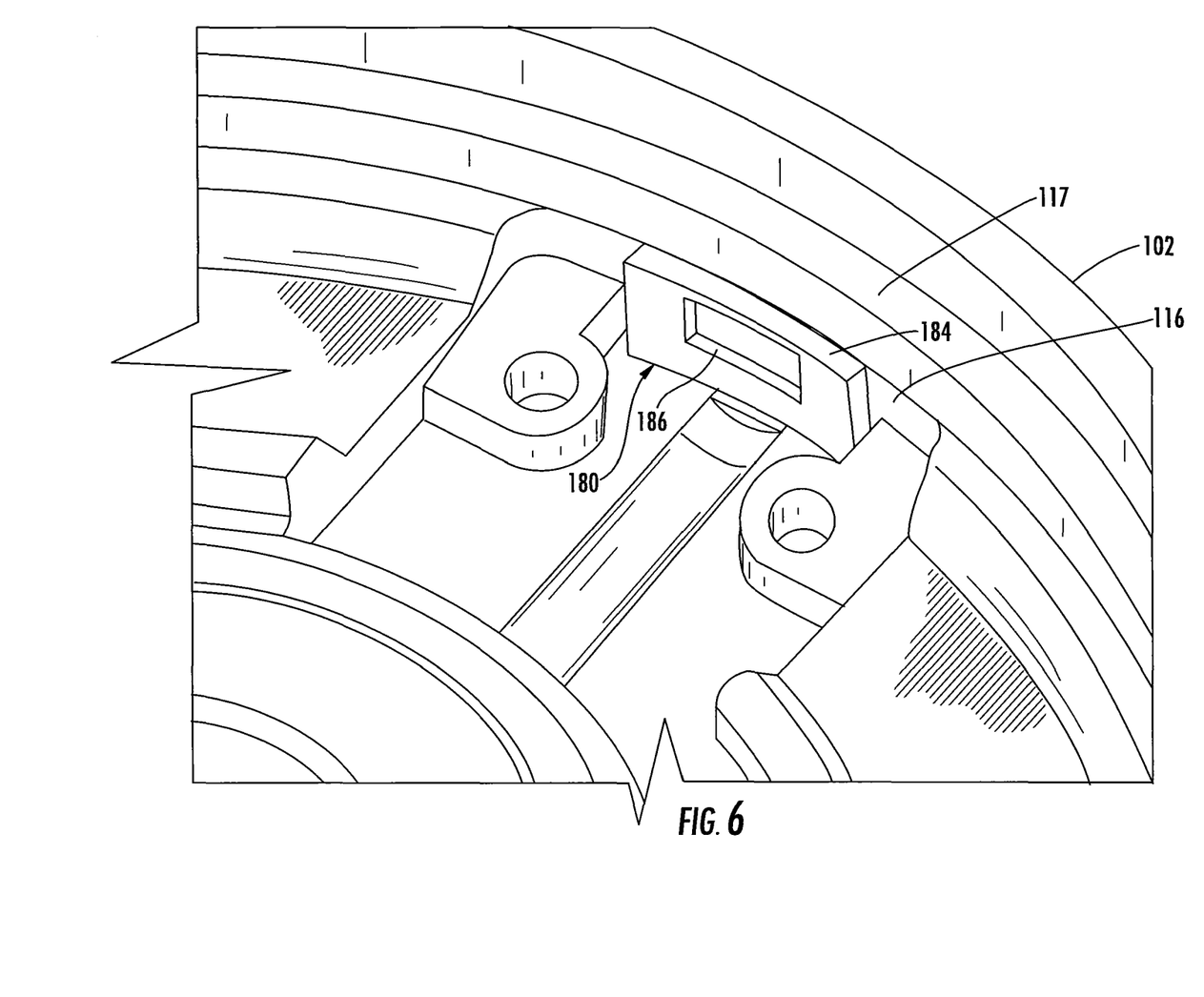
FIG. 6 is a partial perspective view of an embodiment of the housing and lens holder.
Figure 7:
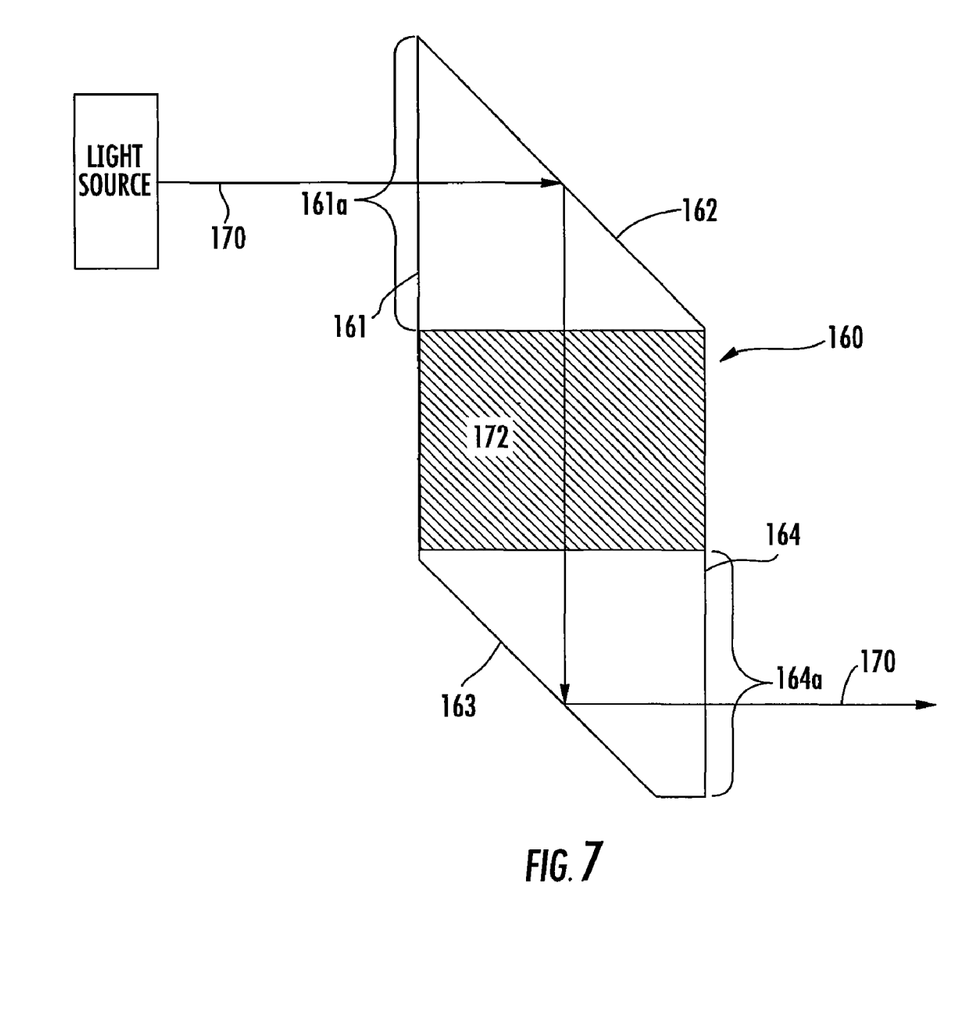
FIG. 7 is a side view of an embodiment of a lens used in one embodiment of the invention.
Figure 8:
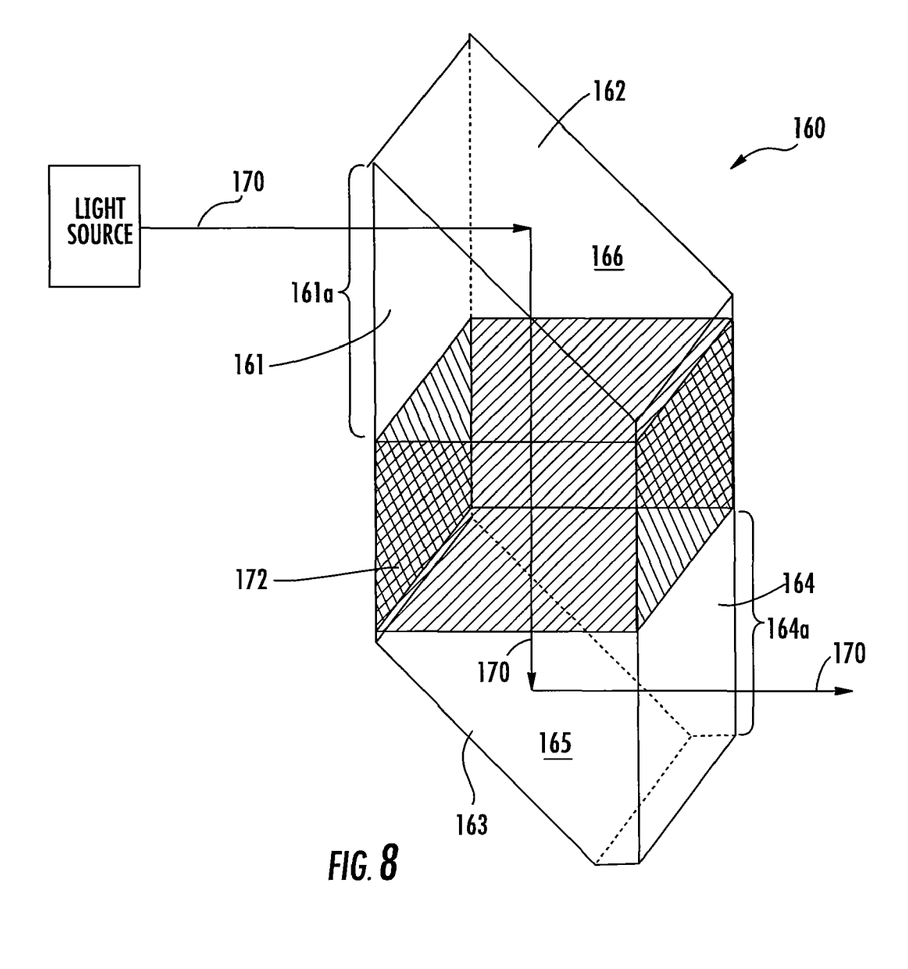
FIG. 8 is a perspective view of an embodiment of a lens used in one embodiment of the invention.

The lens holder 180 is inserted in aperture 116 formed in the wall 117 of housing 102 such that light from the light source contacts the lens 160 and is directed out of the lens along a path substantially parallel to the surface 111 of the laser guide 100. Referring to FIG. 6, the lens holder 180 is inserted into the aperture 116 such that the lens retaining portion 182 is located in the aperture 116 and the flange portion 184 abuts the inside surface of housing wall 117. Sealant or adhesive maybe applied between the flange portion 184 and wall 117 to create a liquid tight seal between the lens holder and the housing. The sealant and or adhesive may also be applied between the retaining portion 182 and the housing 102. The sealant or adhesive may be used to secure the lens holder 180 in the housing 102 or a separate attachment mechanism may be used such as a mechanical attachment between housing and lens holder. Further a combination of the sealant and separate attachment mechanism may be used to secure the lens holder to the housing. While the lens holder 180 has been described as a separate element from the housing, the lens holder may be made integrally with the housing and the lens sealed in the lens holder as previously described.

Figure 11:
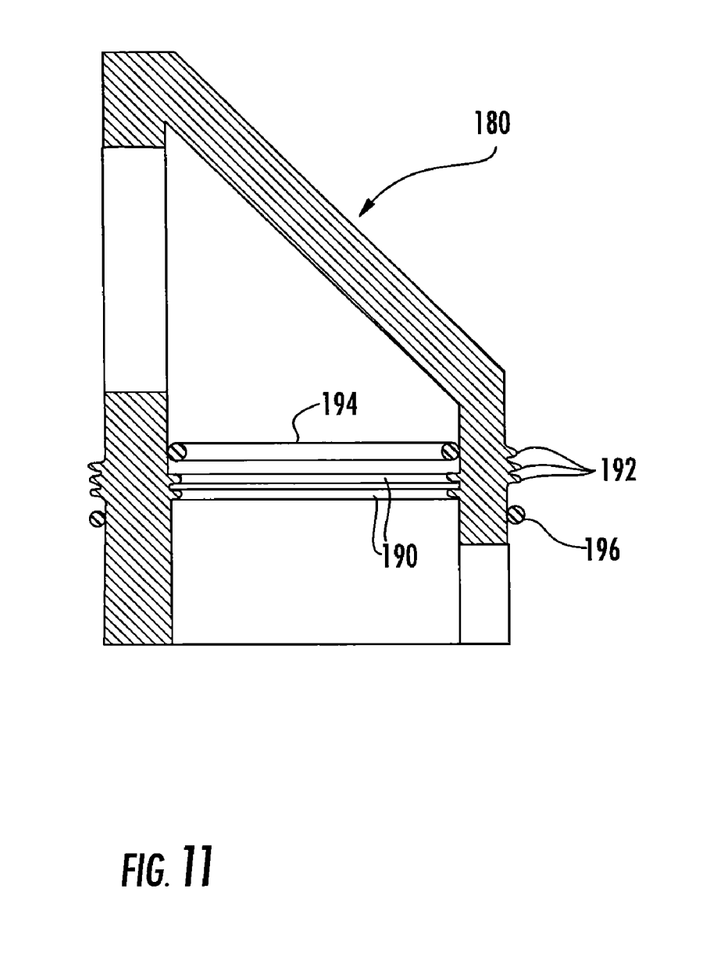
FIG. 11 is a section view of an embodiment of a lens holder used in one embodiment of the invention.

The liquid tight seal between the lens 160 and lens holder 180 and/or between the lens holder 180 and housing 102 may include a mechanical seal such as a separate o-ring or gasket or an integrally formed gasket. An integrally formed gasket is shown in FIG. 11 where raised portions 190 and 192 are formed around the periphery of the interior and exterior of the lens holder 180 such that the raised portions 190 and 192 contact the lens 160 and housing 102, respectively. A separate o-ring is shown in FIG. 11 where o-rings 194 and 196 are located around the periphery of the interior and exterior of the lens holder 180 such that the o-rings 194 and 196 contact the lens 160 and housing 102, respectively.

Other mechanical seals may also be used. The mechanical seals and sealant may both be used if desired.

Referring to FIG. 12, a test port 200 is provided on the housing 102 or housing cover 122 for testing the laser guide during the manufacturing process to ensure that the laser guide has a good seal. The test port 200 comprises a hole 201 that communicates the interior 108 of the laser guide 100 with the exterior of the laser guide. A source of high and low pressure 202 such as an air pump/vacuum is connected to the port 200 via line 211 or other conduit. A valve 204 and pressure gauge 208 may be provided in line 211. The test port 200 may include screw threads or other engagement mechanism for connecting the port 200 in a sealed manner to the source of positive and negative atmospheric pressure 202. After the test procedure is completed line 211 is removed from port 200 and a cap 206 is sealed into port 200 to complete the assembly. The cap 206 may be screw threaded to the port 200 using thread sealant, gasket or o-ring 210. The cap may also be welded to the port, secured by adhesive or otherwise sealingly engaged with the port.

Figure 13:
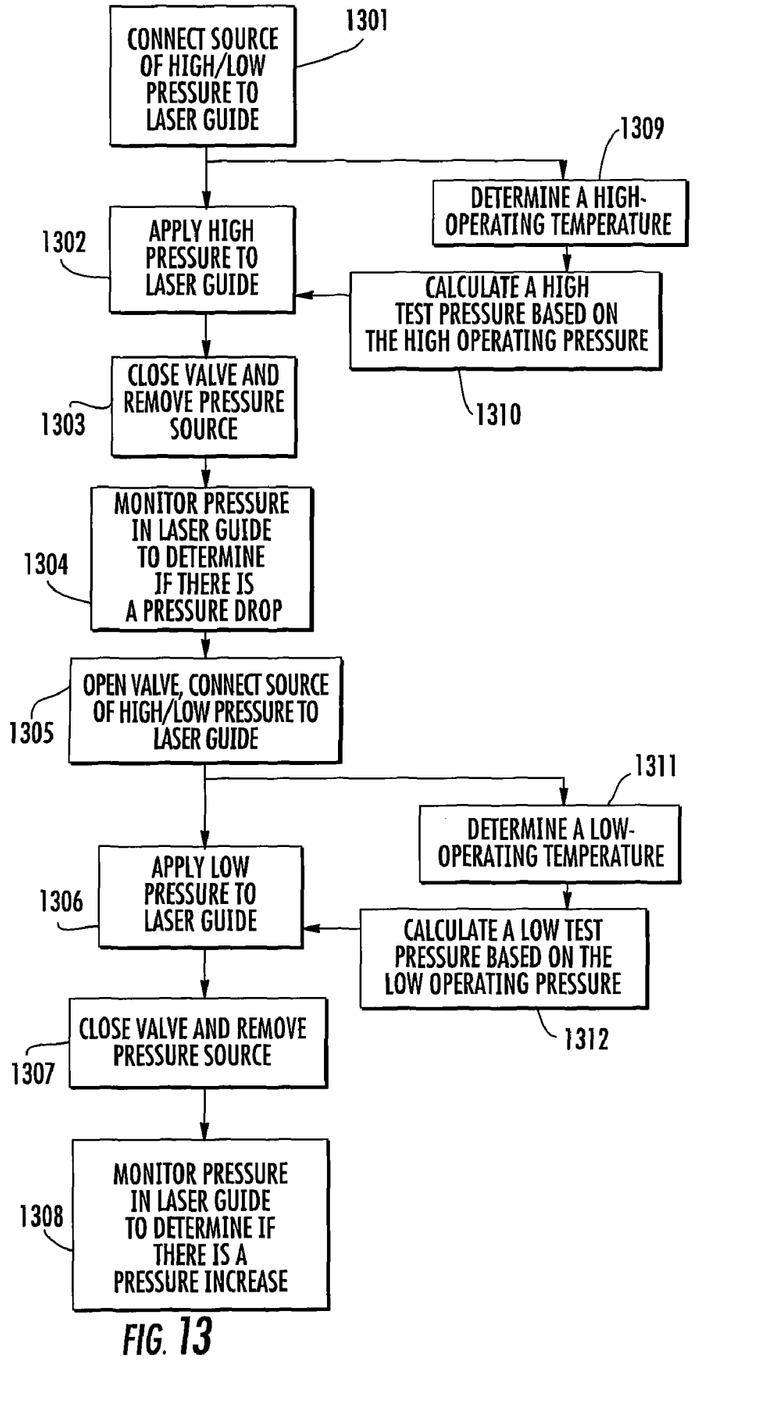
FIG. 13 is a flow diagram illustrating an embodiment of the test procedure for a laser guide.

Referring to FIG. 13, the source of low/high pressure 202 is secured to the test port 200 of the laser guide (block 1301). High pressure is applied to the interior of the laser guide via the test port (block 1302). A pressure gauge 208 may be used to verify the pressure. The valve 204 is closed to maintain a constant pressure in the laser guide and the source of pressure is removed (Block 1303). The pressure on gauge 208 is monitored over a period of time to determine if there is a pressure drop in the internal chamber 110 (block 1304). If no pressure drop is determined, the source of low pressure is connected to port 200 and valve 204 is opened (block 1305). A negative low pressure is applied to the interior of the laser guide via the test port (block 1306). A pressure gauge 208 may be used to verify the pressure. The valve is closed and the low pressure source 202 is removed (block 1307). The pressure on gauge 208 is monitored over a period of time top determine of there is a pressure increase in the internal chamber 110 (block 1308). Other mechanisms for determining a drop or increase in pressure may also be used. Further, the low pressure test may be conducted before the high pressure test.

A pressure greater than and less than atmospheric pressure may be applied to the interior of the housing. In one embodiment a test pressure of +3 psi above atmospheric pressure and a test pressure of −3 psi below atmospheric pressure are applied to the interior of the housing via test port 200. The test pressures applied to the laser guide are determined as follows:

$$P_{gauge} = P_{abs} - P_{atm} \text{ where}$$

$P_{gauge}$ is the gauge pressure (psig)
$P_{abs}$ is the absolute pressure (psia)
$P_{atm}$ is the atmospheric pressure
The Ideal Gas Law states:

$$PV = nRT \text{ where}$$

P—pressure
V—volume
n—number of moles of gas
R—Ideal Gas Constant
T—temperature
With the laser guide, the interior chamber 110 of the laser guide is a sealed chamber of known volume. Thus, V and n are constants. Therefore, $$P/T = nR/V = \text{constant, and}$$

$$P_1/T_1 = P_2/T_2 = P_3/T_3$$

Assuming that the laser guide is assembled at about 25° C. and one atmosphere of pressure then $T_1 = 25°$ C.$= 298.15$ K and $P_1 = 14.7$ psig.

If the laser guide is operated in a freezing environment (low operating temperature) (block 1311), then $T_2 = 10°$ C.$= 273.15$ K and calculating a low test pressure $P_2$:

$$P_2 = P_1 T_2 / T_1 \text{ or}$$

$$(14.7 \text{ psig})(273.15\text{K})/(298.15\text{K}) = 13.47 \text{ psia}$$

$$13.47 \text{ psia} - 14.7 \text{ psia} = -1.23 \text{ psig (block 1312)}$$

If the laser guide is operated at 50° C. (high operating temperature) (block 1309), then calculating a high test pressure $P_2$:

$$P_2 = P_1 T_2 / T_1 \text{ or}$$

$$(14.7 \text{ psig})(323.15\text{K})/(298.15\text{K}) = 15.93 \text{ psia}$$

$$15.93 \text{ psia} - 14.7 \text{ psia} = 1.23 \text{ psig (block 1310)}$$

Thus, for expected or assumed operating temperature ranges a calculated internal pressure variation of between ±1.23 psig is expected on the device. Using a safety factor of 2× the calculated internal pressure results in a test pressure range of between ±3 psig. Other safety factors may also be used. Moreover, different expected or assumed temperature ranges may be used to calculate the internal pressure variation. The calculated high and low pressures are used as the high and low test pressures to test the seals. If desired only the high test pressure or low test pressure may be used for the test.

Specific embodiments of an invention are described herein. One of ordinary skill in the art will recognize that the invention has other applications in other environments. In fact, many embodiments and implementations are possible. The following claims are in no way intended to limit the scope of the invention to the specific embodiments described above.

The invention claimed is:

1. A laser guide for saws having arbors comprising:
  a first housing portion and a second housing portion, wherein the first housing portion and the second housing portion define an interior aperture therethrough;
  a seal between the first housing portion and the second housing portion;
  a lens located in the first housing portion, the lens configured to transmit light to the exterior of the laser guide along a path substantially perpendicular to an axis of the interior aperture; and
  a seal between the lens and the first housing portion.

2. The laser guide of claim 1 where the first housing portion and second housing portion meet along a first seam and a second seam, a seal formed along each of said first seam and said second seam.

3. The laser guide of claim 2 where the interior aperture defines the second seam.

4. The laser guide of claim 1 wherein the lens is located in a lens holder.

5. The laser guide of claim 4 wherein the lens holder is secured to said housing.

6. The laser guide of claim 4 wherein the lens is sealed to the lens holder about its periphery.

7. The laser guide of claim 6 wherein the lens is sealed to the lens holder using adhesive.

8. The laser guide of claim 6 wherein the lens is sealed to the lens holder using a sealant.

9. The laser guide of claim 6 wherein the lens is sealed to the lens holder using a mechanical seal.

10. The laser guide of claim 6 wherein the lens is sealed to the lens holder along non-optical portions of the lens.

11. The laser guide of claim 6 wherein the lens holder is sealed to the housing.

12. The laser guide of claim 1 wherein a test port is located in the first housing portion or the second housing portion.

13. The laser guide of claim 12 wherein the housing defines an internal chamber and the test port communicates the internal chamber.

14. The laser guide of claim 13 wherein the test port is adapted to communicate positive or negative pressure to the internal chamber.

15. The laser guide of claim 12 wherein the test port is sealed.

* * * * *